United States Patent [19]

Mannarino

[11] 4,205,465
[45] Jun. 3, 1980

[54] OCCULARMOTOR EDUCATIONAL DEVICE

[76] Inventor: Frank Mannarino, 7603 NW. 40th St., Coral Springs, Fla. 33065

[21] Appl. No.: 805,929

[22] Filed: Jun. 13, 1977

[51] Int. Cl.² .............................................. G09B 19/00
[52] U.S. Cl. .................................. 35/29 R; 35/22 R; 273/144 A
[58] Field of Search .................... 35/8 R, 22 R, 22 A, 35/29 R; 273/144 R, 144 A, 144 B, 148 R

[56] References Cited

U.S. PATENT DOCUMENTS

| | | | |
|---|---|---|---|
| 1,562,197 | 11/1925 | Andrew | 273/144 A |
| 2,003,979 | 6/1935 | Skoric | 273/144 A |
| 2,315,323 | 3/1943 | Fostos | 273/144 A |
| 2,334,092 | 11/1943 | Hickey | 273/148 R |
| 2,555,132 | 5/1951 | Hickey | 273/144 A X |
| 3,679,208 | 7/1972 | Carrano | 273/144 R X |
| 3,760,511 | 9/1973 | Matsumoto | 35/22 A |

OTHER PUBLICATIONS

Stoelting Company, 1974 Catalog, p. 12 only, "Timing-Counting".

Primary Examiner—Harland S. Skogquist
Attorney, Agent, or Firm—Robert J. Van Der Wall

[57] ABSTRACT

A device suitable for use in a game and method for the education, enhancement and therapy of occular, motor, and occular-motor skills, wherein the device comprises an elevated reservoir containing inscribed elements which can be selectively released through at least one perforation to a plurality of sloping chutes connected beneath the reservoir, and including a lower terminus of the chutes and inscribed racks which permit a subject to move the elements to detents in the racks. The method comprises the steps of examining the elements selectively released from the reservoir, determining a substantially identical or analogous inscription on a rack, and placement of each element released in turn thereon.

1 Claim, 5 Drawing Figures

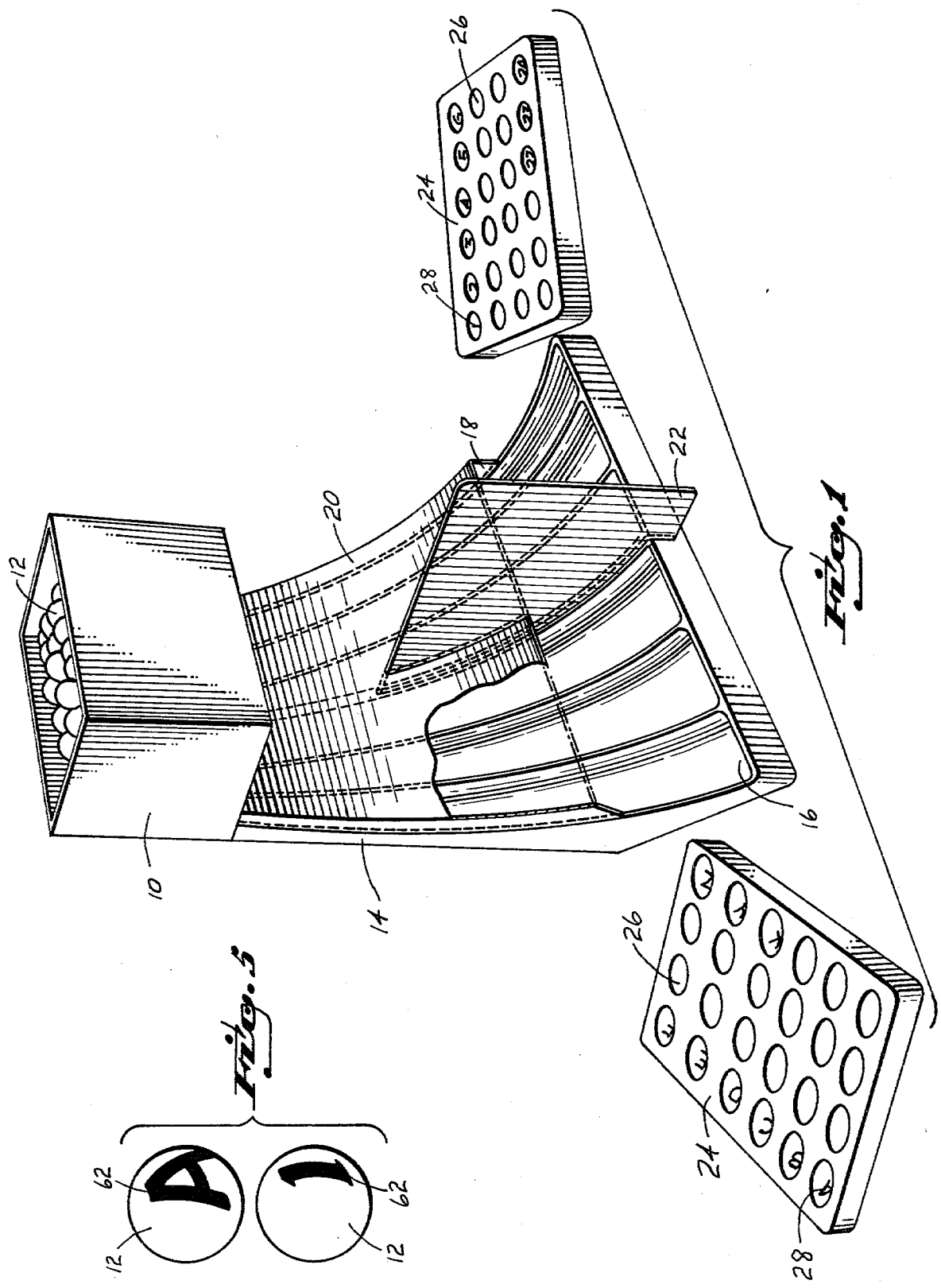

U.S. Patent Jun. 3, 1980 Sheet 2 of 2 4,205,465
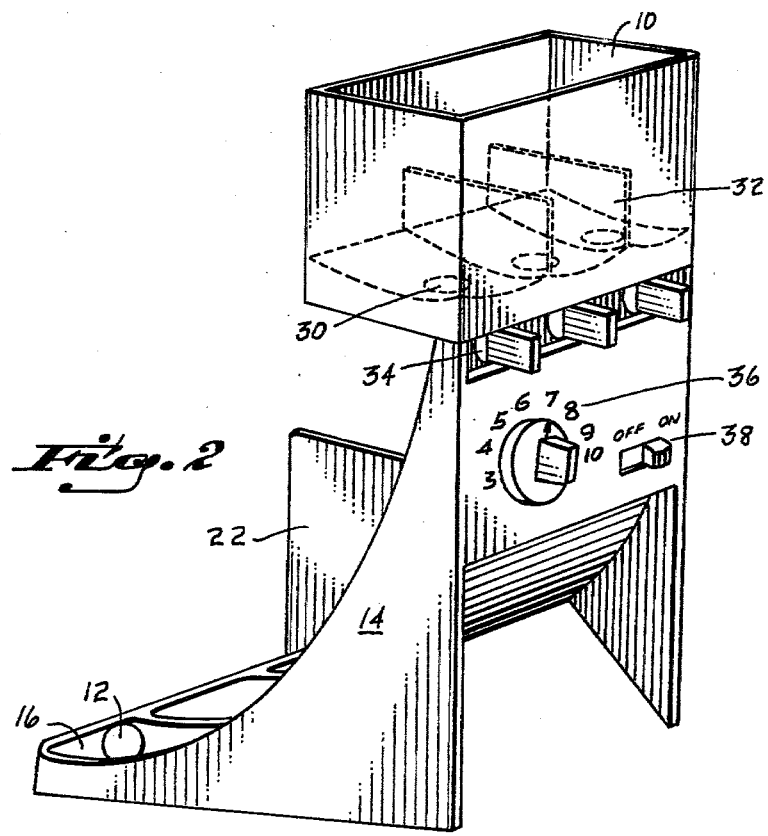
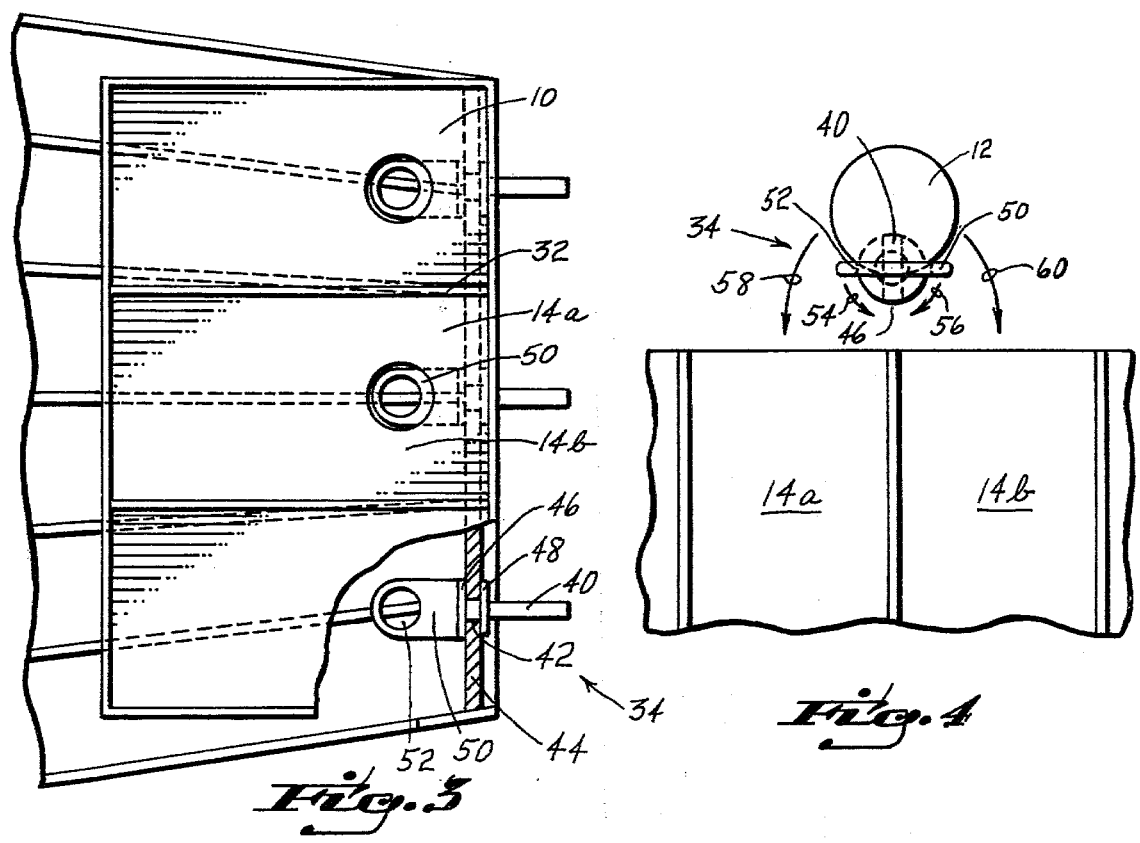

OCCULARMOTOR EDUCATIONAL DEVICE

FIELD OF THE INVENTION

The invention relates to the field of educational and therapeutic devices and methods, and specifically deals with occular, motor, and occularmotor education, enhancement and therapy, in a format that is also suitable for use as a game.

BACKGROUND OF THE INVENTION

Motor skills are significant in virtually all human dynamic activity. Such skills involve not only spatial three dimensional perception, orientation, and control, but mental and occular skills and the coordination thereamong.

Modern educators, physical therapists, optometrists, and other specialists have recognized and isolated numerous aspects of these skills and the development and training of them.

These begin with such obvious functions as the recognition of numbers, letters, shapes, etc., and increasing speed of such recognition, central focusing of the eyes on the item of interest, and move to such functions as occular muscle development, peripheral awareness of the surroundings, training the eyes to cross the theoretical midline between the eyes and the like. Also, despite the fact the most individuals have a dominant eye, it is known that when focusing on one object in the periphery of the field of vision, the eye nearest the object becomes the lead eye and the other becomes the support eye. Thus, bilateral training of occular lead-support systems is advantageous, particularly to minimize excessive dependence on the dominant eye and better balance the occular functions.

Of course, it is universally known that most individuals have a dominant hand and it is similarly advantageous to force bilateral manual or motor training and development. This can be accomplished by requiring use of each hand individually. However, with both hands are needed for certain actions, the natural tendency is to use a dominant hand as the lead hand and the other as a support hand. It is often preferable or more efficient to use the reverse sequence, and thus bilateral manual lead-support system training is also advantageous. Specifically, if a person is right handed he or she will tend to always use the right hand as the lead hand and the left hand, if at all, as the support hand. Yet the location of activities to be performed may make it preferable to use the left hand as the lead hand.

Of course, the importance of eye-hand coordination has long been recognized, since this function ties together all the individual aspects of dynamic human activity.

Not to be overlooked are the related mental aspects that have also been isolated and must be developed. These include spatial orientation and perception, comprehension and judgment of oblique angles, a sence of directionality, mastery of sequencing and the building of self-confidence.

Much of ordinary human activity provides a continuing source of education and practice in such skills, but there exists a threshold question in acquiring, enhancing or in case of certain therapy, reacquiring, a minimal competence sufficient to enable the subject to initially exercise essential functions. Generally, the prior art has been directed at a particular aspect of these functions, such as recognition of size and shape, or the training of manual dexterity. For example, Patterson, U.S. Pat. No. 2,377,100 is directed at instruction of shape, size and geometrical form. Similarly, Welbourn, U.S. Pat. No. 3,479,751 is a manual dexterity training device.

There are also devices for teaching coordination or rhythm, as Kozak, U.S. Pat. No. 3,657,456 and devices to measure either movement of the human body for athletic purposes, Dealy, U.S. Pat. No. 3,766,538, or muscular reaction times, Reid, U.S. Pat. No. 1,729,227.

However, there seems to be little art in the realm of teaching occularmotor coordination. The only referencce specifically aimed at this point known to the applicant is a selectively illuminable toy, Barnard, U.S. Pat. No. 3,654,710, but Barnard lacks any means to force use of both hands, midline crossing with both hands and eyes, timing control, lead-support training of either hands or eyes, peripheral awareness spatial orientation and other features of the subject invention.

SUMMARY OF THE INVENTION

With the foregoing in mind, it is a principal object of the invention to provide a single device and methods for occular, motor, and occularmotor education, enhancement and therapy.

A second principal object of the invention is to provide a single device and methods for multiple specific types of occular training, including recognition of numbers, letters, shapes, etc., gradually increasing speed in recognition which can be timed, central focusing, occular muscle development, peripheral awareness, occular midline crossing, and bilateral occular lead-support enhancement.

A third principal object of the invention is to provide a single device and methods which force the use of both hands, not only individually, but also as the lead hand of a lead-support system, resulting in true bilateral manual training.

A fourth principal object of the invention is to provide a single device and methods for occularmotor coordination, training and enhancement.

Another object of the invention is to provide a framework and mechanism for the development of spacial orientation and perception, comprehension of oblique angles, sense of directionality, mastery of sequencing, and the building of self-confidence.

One more object of the invention is providing a single device and methods which permit education, enhancement and therapy of all the foregoing aspects.

A further object of the invention is to provide a device and methods suitable for use in various games which employs all the foregoing aspects.

Other objects and advantages of the present invention will become apparent from the following descriptions and claims, and the accompanying drawings.

In accordance with the present invention there is disclosed an elevated reservoir suitable for containing a multiplicity of inscribed elements, beneath which is attached a plurality of sloping chutes sized to guide gravity fed inscribed elements to a lower terminus of the chutes. The interior of the reservoir and the upper extremity of the chutes communicate through at least one perforation in the reservoir, said perforation equipped with means to selectively release to a specifically chosen chute a gravity fed inscribed element.

The invention may be equipped with variable timing, switch and signal means to allow the operator to preselect a time interval, turn on the timer switch when an inscribed element is released, and receive a signal when the time selected has expired.

The chutes also may include an opaque removable partial cover which is open at the lower end to allow the inscribed elements to freely pass thereunder to the lower terminus of the chutes. The removable cover hides the element from the subject until it appears near the chute terminus. It is removable so the subject may have more warning as to which chute is in use and thus react more quickly. This feature increases the flexibility of the device for use with subjects with deficient skills who require longer reaction times.

Between two of the chutes may be located a removable hand barrier, which is used to bar use of the left hand in picking up from the right side chute(s) terminus inscribed elements, and vice versa for the right hand and left side chute(s). The barrier is removable so that either hand may be employed at all chutes when that is desired.

Finally, the invention includes a plurality of inscribed racks placed on both sides of the terminus of the chutes. The racks have detents to accept inscribed elements which have traversed a chute to its terminus. The inscriptions on the rack are either substantially identical or analogous to those on the elements. Of course different sets of racks and companion elements may be employed to vary the difficulty of the exercise in accordance with the skills of the subject. Also, as used herein, inscription is not limited to a writing, but refers to any means employed to distinguish elements and rack positions from each other. Preferably, the racks are structurally separate from the chutes and reservoir so that they can be placed at any convenient location proximal or distal from the chutes, depending on the degree of manual exercise desired for the subject, and his or her size and skills.

In use the reservoir may be loaded, by an operator with all of the inscribed elements in a random manner. The operator preselects a time interval appropriate to the skills of the subject and then simultaneously activates the timer and releases an element from the reservoir to one of the chutes. When the removable cover is in use, the identity of the chute will not be disclosed to the subject until the element has traversed the chute selected by the operator and had appeared from beneath the cover at the chute terminus.

The subject must then examine the inscription on the element and match to a substantially identical or analogous inscription in one position on one of the racks. The element is then picked up by the subject's hand that is closest to the rack and placed in a detent in the rack having the substantially identical or analogous inscription.

If the optional hand barrier is employed, and an element comes down a chute on the opposite side of the hand barrier from the rack where it is to be placed, then one hand, the lead hand, is used to pick the element up, it is passed to the other or support hand, and that hand places the element in the rack. In that manner, the manual lead-support system is exercised.

Thus, it will be seen that there is provided a single device and methods for occular, motor, and occularmotor education, enhancement and therapy. The invention provides occular training that includes recognition of numbers, letters, shapes, etc., which are the inscriptions on the elements and the racks. Speed of recognition is increased by altering the preselected timing in which the operation is to be performed. Self-confidence of the subject may be built up by informing the subject of his or her increasing speed.

Other occular functions enhanced are central focusing, which is achieved by the subject focusing on the inscriptions on the elements and racks. Occular muscular development is achieved by the eyes shifting up and down and back and forth to watch the elements, find the chute in use, locate the rack inscription substantially identical or analogous to the inscription on the element in use, and in picking up and placing the element in its proper position on the rack. Peripheral awareness is enhanced by the subject's recognition of the various positions and inscriptions on the racks while actually focusing on the chutes terminus when an element is fed from the reservoir.

Additional occular functions employed are midline crossing, which occurs as the subject looks from one side of the entire device to the other, and occular lead-support system, which is employed as the eye nearest the rack having the sought for inscription is located and leads the eye furthest from that rack to focus upon that inscription.

Of course, eye-hand coordination results whenever elements are moved from the chutes terminus to a rack. Training and use of both hands is effected by movement of the elements from the chutes terminus to the racks, and can be altered to emphasize one hand or the other by removable hand barrier, or by limiting use to one hand.

Spatial orientation and perception are employed in detecting the position of an inscription that is substantially identical to or analogous to an inscription on an element that has traversed a chute, and for directing the placement of an element in the appropriate detent in a rack. Oblique angle training is the result not only of the oblique relationship of the chutes with respect to each other, but from angular placement of the racks with respect to the chutes and the movement of elements therebetween.

Directionality occurs in the return of the subject to the neutral position after placing one element in anticipation of the next element traversing a chute. Mastery of sequencing is developed ont only by the repetition of the steps in locating the chute in use, determining the proper location in a rack and placing it there, but also in the use of the manual lead-support system. Self-confidence is developed by the successful performance of the operation and by gradual improvement in the time in which it is performed.

The invention will be better understood from the following detailed description of the embodiments thereof with reference to the appended drawings, in which:

DESCRIPTION OF THE DRAWINGS

FIG. 1 is a perspective partially broken view of the front of the invention, including the separate element racks on both sides of the chutes and inscribed elements in the reservoir.

FIG. 2 is a perspective view of the rear of the invention with the elements removed from the reservoir to show the internal structure of the reservoir in phantom.

FIG. 3 is a fragmentary enlarged partially broken top view showing detail of the reservoir and element drop means.

FIG. 4 is a fragmentary enlarged schematic view showing how the element drop means can be used to selectively release an element to either one of two chutes.

FIG. 5. is a perspective view of typical elements bearing simple inscriptions.

DETAILED DESCRIPTION OF THE PREFERRED EMBODIMENTS

Referring now to each of the foregoing figures, and using like numerals to designate similar parts throughout the several views, a preferred embodiment will now be described.

FIG. 1 discloses an elevated reservoir 10 containing a multiplicity of inscribed elements 12. The reservoir is mounted over a plurality of sloping and obliquely angled chutes 14 having a lower terminus 16 exposed to view beneath the open lower end 18 of a removable opaque cover 20 that is located over the upper end of the chutes 14.

A removable hand barrier 22 is located between two of the chutes. On both sides of the terminus 16 of the chutes are placed a plurality of inscribed racks 24. The racks have detents 26 to receive the elements 12 and inscriptions 28 which are either identical or analogous to inscriptions 62 on the elements 12.

Turning now to FIG. 2, a reservoir 10 is mounted atop sloping chutes 14 upon which the removable hand barrier 22 is positioned. The reservoir 10 communicates with the chutes 14 through at least one perforation 30 in the bottom of the reservoir, which may also optionally be provided with dividers 32 when a plurality of perforations 30 are employed. Each perforation is equipped with means 34 to selectively release to a specifically chosen chute a gravity fed inscribed element.

The invention includes a variable timer 36 with internal signal means (not shown) and a timer on-off switch 38 to allow the operator to preselect a time interval appropriate to the skill of the subject and then initiate the time sequence at the same moment as an element is gravity fed to a chute. An element 12 is shown at the terminus 16 of a chute.

FIG. 3 shows a top view of the reservoir 10 with dividers 32 and perforations 30. Each perforation 30 is positioned between two adjacent chutes 14a and 14b. Located proximal to each perforation is means 34 to selectively release to one of the two adjacent chutes an element 12. Selective element release means 34, as disclosed by the broken portion of FIG. 3, comprises a manually operated lever 40 rotatably mounted in a port 42 in rear wall 44. Movement of the selective element release means 34 is substantially limited to rotational motion by flanges 46 and 48. Release of elements 12 (not shown in FIG. 3) is controlled by the position of tongue 50 connected to the manually operated lever 40. Tongue 50 has a recess 52 which is adapted to hold one element pending release to one or the other of the two proximal chutes.

Schematic FIG. 4 better illustrates the release technique described above. An element 12 has already passed through perforation 30 (not shown in FIG. 4) and is held in recess 52 of tongue 50. Flange 46 is shown substantially limiting movement to rotational motion shown by arrows 54 and 56, effected by turning manually operated lever 40. Thus, when lever 40 is turned in the direction of arrow 54, element 12 will be gravity fed as shown by arrow 58 to chute 14a. Similarly, when lever 40 is turned in the direction of arrow 56, element 12 will be gravity fed as shown by arrow 60 to chute 14b. When turned in either direction, tongue 50 prevents another element 12 from passing completely through perforation 30 because of its closer proximity to the perforation when turned. When selective element release means 34 is returned to the neutral position as shown in FIG. 4, then another element 12 can come to rest in recess 52 of tongue 50 and await release as hereinabove described.

Finally, FIG. 5 shows two elements 12 with inscriptions 62 which may be substantially identical to or analogous to inscriptions 28 in or near the detents 26 of racks 24 shown in FIG. 1.

While the invention has been described in connection with a preferred embodiment, it will be understood that there is no intention to thereby limit the invention. On the contrary, there is intended to be covered all alternatives, modifications and equivalents as may be included within the spirit and scope of the invention as defined by the appended claims.

What is claimed is:

1. A device for the education, enhancement and therapy of occular, motor, and occularmotor skills comprising:

an elevated reservoir;

a plurality of obliquely angled and downwardly sloping chutes disposed beneath the reservoir, each of which has a terminus at its lower end and at its upper end is in communication with the reservoir through at least one perforation near the bottom of said reservoir;

a multiplicity of inscribed elements sized to traverse the perforation;

a rotationally mounted lever attached to the chutes and connected to a tongue proximal the perforation, which tongue is arranged to selectively permit one element at a time to traverse the perforation to a predetermined chute, variable timing, switch and signal means, an opaque removable cover placed over the chutes and open at its lower end to allow elements to traverse each chute to its terminus;

a removable substantially vertical hand barrier mounted between two chutes; and a plurality of racks having detents sized to accept the inscribed elements, said racks bearing inscriptions near the detents that are analogous to those on the elements.

* * * * *